US012636803B2

(12) United States Patent
Kulshreshtha

(10) Patent No.: US 12,636,803 B2
(45) Date of Patent: May 26, 2026

(54) ELECTRIC SHAVER WITH SPACER ELEMENTS

(71) Applicant: Skull Shaver LLC, Sioux Falls, SD (US)

(72) Inventor: Neel Kulshreshtha, Sioux Falls, SD (US)

(73) Assignee: SKULL SHAVER LLC, Sioux Falls, SD (US)

( * ) Notice: Subject to any disclaimer, the term of this patent is extended or adjusted under 35 U.S.C. 154(b) by 123 days.

(21) Appl. No.: 18/770,172

(22) Filed: Jul. 11, 2024

(65) Prior Publication Data

US 2025/0326141 A1 Oct. 23, 2025

Related U.S. Application Data

(60) Provisional application No. 63/635,745, filed on Apr. 18, 2024.

(51) Int. Cl.

*B26B 19/38* (2006.01)
*B26B 19/14* (2006.01)
*B26B 19/20* (2006.01)

(52) U.S. Cl.

CPC .......... *B26B 19/3826* (2013.01); *B26B 19/20* (2013.01); *B26B 19/141* (2013.01); *B26B 19/386* (2013.01)

(58) Field of Classification Search

CPC ... B26B 19/3826; B26B 19/20; B26B 19/386; B26B 19/141; B26B 19/382; B26B 19/14; B26B 19/38; B26B 19/3853; B26B 19/046; B26B 19/02; B26B 19/28

USPC ...... 30/357, 34.1, 41.6, 43, 43.7, 43.8, 43.9, 30/43.91, 43.92, 346.51

See application file for complete search history.

(56) References Cited

U.S. PATENT DOCUMENTS 2,279,682 A 4/1942 Jackson
2,720,696 A 10/1955 Wadsworth
3,008,233 A * 11/1961 Waggoner ........... B26B 19/3813 30/537
3,109,236 A * 11/1963 Wolf ....................... B26B 19/20 30/537
3,178,815 A * 4/1965 Madrid ............... B26B 19/3813 30/286

(Continued)

FOREIGN PATENT DOCUMENTS

CN 109176612 A * 1/2019 ......... B26B 19/3806
CN 113427522 A * 9/2021 ........... B26B 19/143

(Continued)

OTHER PUBLICATIONS https://www.amazon.com/Skull-Shaver-Pitbull-Silver-Electric/dp/B081CLSKQX/ref=asc Skull Shaver, www.amazon.com, 5 pages, available as early as Nov. 2019 (Year: 2019).

*Primary Examiner* — Ghassem Alie
(74) *Attorney, Agent, or Firm* — McCarter & English, LLP

(57) ABSTRACT

An example electric shaver head is provided. The electric shaver head includes a shaver head housing, and at least one cutter assembly disposed in the shaver head housing. The electric shaver head includes two or more spacer elements positioned over the cutter assembly. The two or more spacer elements provide an offset distance from a top surface of the at least one cutter assembly to create stubble when shaving.

16 Claims, 15 Drawing Sheets

(56) References Cited

U.S. PATENT DOCUMENTS

| | | | | |
|---|---|---|---|---|
| 4,003,390 | A * | 1/1977 | Solie | B26B 19/20 132/213 |
| 4,709,475 | A | 12/1987 | Phung | |
| 5,520,616 | A | 5/1996 | Hofmeister | |
| 6,018,877 | A | 2/2000 | Greene | |
| 6,550,148 | B2 | 4/2003 | Cecil | |
| D601,301 | S | 9/2009 | Bao | |
| D672,504 | S | 12/2012 | Lyles | |
| D693,060 | S | 11/2013 | Lyles | |
| 8,726,528 | B2 | 5/2014 | Lyles | |
| D853,644 | S | 7/2019 | Stowers et al. | |
| D853,645 | S | 7/2019 | Stowers et al. | |
| 10,913,170 | B2 * | 2/2021 | Phoon | B26B 19/20 |
| D914,290 | S | 3/2021 | Kulshreshtha | |
| 2005/0246906 | A1 | 11/2005 | Greene | |
| 2008/0072430 | A1 | 3/2008 | Cafaro et al. | |
| 2008/0092393 | A1 | 4/2008 | Van Der Meer | |
| 2009/0025234 | A1 | 1/2009 | Carlucci | |
| 2011/0030220 | A1 | 2/2011 | Shimizu | |
| 2013/0212885 | A1 * | 8/2013 | Lyles | B26B 19/3853 30/42 |
| 2018/0085944 | A1 * | 3/2018 | Bady | B26B 19/205 |

FOREIGN PATENT DOCUMENTS

| | | | | |
|---|---|---|---|---|
| DE | 3320290 | A1 | 12/1984 | |
| EP | 3575049 | A1 * | 12/2019 | B26B 19/3813 |
| KR | 20120006010 | U * | 8/2012 | B26B 19/141 |

* cited by examiner

ELECTRIC SHAVER WITH SPACER ELEMENTS

CROSS-REFERENCE TO RELATED APPLICATIONS

This application claims the benefit of a, commonly assigned U.S. Provisional Patent Application No. 63/635,745, which was filed on Apr. 18, 2024. The entire content of the foregoing provisional application is incorporated herein by reference.

BACKGROUND

The present invention is directed toward electric shavers and, more particularly, toward electric shavers having spacer elements that allow for stubble to remain after shaving.

Electric shavers generally include a hand-held housing that contains motor and power supply-related components that drive one or more cutters or cutting heads. The housing also provides a form that fits the user's hand sufficiently as a grip so as to allow the user to manipulate the shaver, especially when reaching upward to shave the head. Various types of cutters are well known in the art. In general, the cutter comprises an outer, stationary, apertured surface and an inner array of reciprocating or rotating blades that operate in a shearing engagement with the outer apertured surface. The motor is mechanically coupled to the cutter and provides motion to the array of blades. Hairs that extend through the apertures in the outer surface are sheared by the inner array of blades. Such electric shavers are intended to provide a clean shave without leaving stubble on the surface of the skin.

When stubble is desired, trimmers with different attachments are generally used. The different attachments allow the user to select the resulting length of the stubble, and typically clip onto the trimmer head in a releasable manner. Trimmers may function optimally when directed along the direction of hair growth, ensuring that the hairs pass between open slots of the attachments for shearing by the blade(s). If the trimmer is passed in a direction perpendicular to the direction of hair growth, the resulting stubble may not have a uniform length. In addition, the attachments may inadvertently unclip or release from the trimmer, resulting in undesired trimming beyond the intended length.

SUMMARY

The present disclosure relates to features that are particular to the shaving of the head and/or face, though not in a limiting manner. As understood by one skilled in the art, the principles of an electric shaver are not restricted to the shaving of a specific part of the body, and may apply to any skin surface. Electric shavers designed more particularly for shaving the face have a grip portion that is configured, predominantly, to be held in such a manner so as to orient the grip below the cutting surface. Shaving the head, however, requires the shaver to be held in such a manner so as to orient the grip above the cutting surface. Note, for example, Published Application No. 2009/0025234 to Carlucci and, particularly, FIGS. 7 and 8 thereof.

An example embodiment relates in general to an electric shaver comprising a housing that provides a container for the motor and power source components and further provides a form, also referred to as a grip, that fits the hand in a comfortable manner when the shaver is oriented with the grip above the cutter surface. In other words, in this orientation the cutter faces downward so as to meet the skin surface of the scalp, and the grip is above the cutter. The cutter surface may comprise flexible members that allow the cutter surface to meet the complex curvilinear surface of the head. The grip portion of the housing comprises a pair of substantially concave surfaces each comprising a central axis that is parallel to the cutter surface and, therefore, tangent to the curved surface being shaved.

When the shaver of the present invention is oriented in the above manner, it is possible to either grip the shaver with two fingers as between the thumb and index finger, or between the index and middle fingers, while resting the remainder of the hand against the skin. This helps the user properly orient and place the cutting surface of the shaver against the skin while being able to feel whether the skin has been sufficiently shaved.

Embodiments of the present disclosure provide an exemplary electric shaver that includes built-in spacer elements which provide a controlled means for leaving stubble during the shaving process. The electric shaver includes a razor head with an array of blades. Each blade assembly of the razor head includes a spacer element ring with protruding spacer elements that provide an offset from the array of blades. This offset travels along the surface of the skin and prevents hairs from being cut too short. In some embodiments, different interchangeable razor heads can be used, each having spacer elements of different heights, thereby allowing the user to vary the length of the stubble remaining after shaving. The overall design of the razor head allows use of the electric shaver in any orientation and movement along any direction, while still providing the shaving/trimming functionality and leaving stubble having a uniform length.

In accordance with embodiments of the present disclosure, an exemplary electric shaver head is provided. The electric shaver head includes a shaver head housing, at least one cutter assembly disposed in the shaver head housing, and two or more spacer elements positioned over the cutter assembly. The two or more spacer elements provide an offset distance from a top surface of the at least one cutter assembly to create stubble when shaving.

In some embodiments, the at least one cutter assembly can be a rotary blade cutter assembly. In some embodiments, the at least one cutter assembly can include first, second, third and fourth cutter assemblies. Each of the first, second, third and fourth cutter assemblies can include the two or more spacer elements.

The at least one cutter assembly can include a cutter body defining a substantially cylindrical configuration. The electric shaver head can include a spacer element ring defining a substantially cylindrical configuration complementary to the substantially cylindrical configuration of the cutter body such that the spacer element ring slides over the cutter body. The cutter body can include a radial flange extending from a rear edge of the cutter body.

The electric shaver head can include a spacer element ring configured to be positioned at least partially around the cutter body. The spacer element ring includes latching elements extending from a rear surface. The latching elements are configured to snap around the radial flange extending from the rear edge of the cutter body to releasably couple the spacer element ring to the cutter body.

The electric shaver head can include a spacer element ring configured to be positioned at least partially around the at least one cutter assembly. The spacer element ring can include the two or more spacer elements. The spacer element ring positions the two or more spacer elements against the top surface of the at least one cutter assembly such that the two or more spacer elements extend outward from the top surface of the at least one cutter assembly. The two or more spacer elements are radially spaced along a front edge of the spacer element ring. Each of the spacer elements can define a first section extending from a body of the spacer element ring in a direction parallel to the body, and a second section curving about 90° inward toward a central longitudinal axis of the spacer element ring.

The top surface of the at least one cutter assembly can include extensions that connect the top surface to a body of the at least one cutter assembly. A number of the extensions corresponds with a number of the two or more spacer elements. The two or more spacer elements can be positioned against the respective extensions of the at least one cutter assembly. The two or more spacer elements prevent a clean shave by preventing hair from fully reaching the at least one cutter assembly. The two or more spacer elements can extend around edges of and partially over the cutter assembly.

In accordance with embodiments of the present disclosure, an exemplary electric shaver is provided. The electric shaver includes a handle and a shaver head releasably coupled to the handle. The shaver head includes a shaver head housing, at least one cutter assembly disposed in the shaver head housing, two or more spacer elements positioned over the cutter assembly. The two or more spacer elements provide an offset distance from a top surface of the at least one cutter assembly to create stubble when shaving.

In accordance with embodiments of the present disclosure, an exemplary method of shaving is provided. The method includes positioning two or more spacer elements over at least one cutter assembly disposed in a shaver head of an electric shaver. The method includes positioning the shaver head of the electric shaver against skin of a user. The method includes creating stubble when shaving with the shaver head based on an offset distance from a top surface of the at least one cutter assembly provided by the two or more spacer elements.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the electric shaver with spacer elements, reference is made to the accompanying figures, wherein.

DETAILED DESCRIPTION

Figure 1:
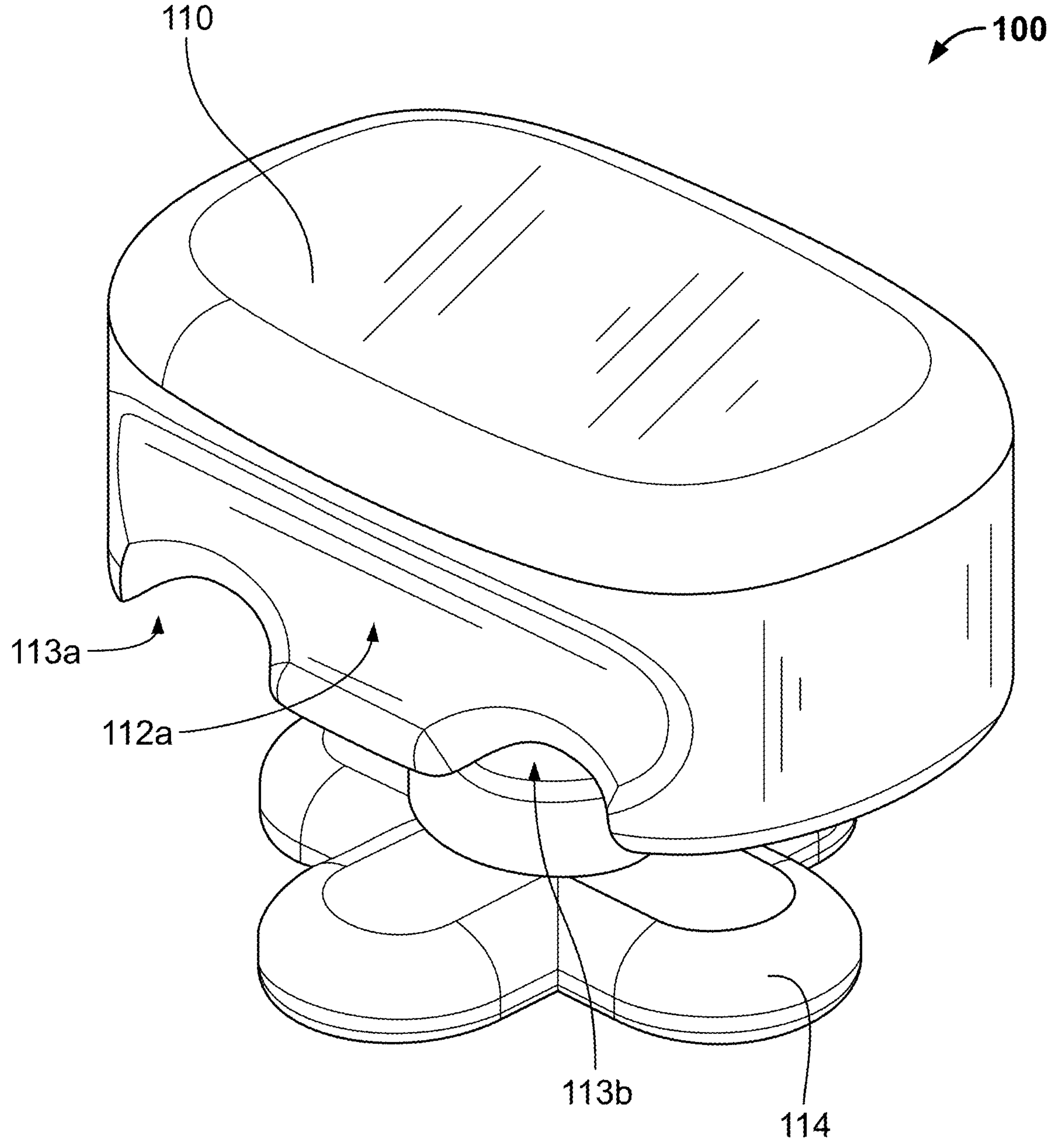
FIG. 1 is a perspective view of an exemplary electric head razor in accordance with embodiments of the present disclosure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the exemplary embodiments.

Although specific terms are used in the following description, these terms are intended to refer only to particular structures in the drawings and are not intended to limit the scope of the present disclosure. It is to be understood that like numeric designations refer to components of like function.

The term "about" when used with a quantity includes the stated value and also has the meaning dictated by the context. For example, it includes at least the degree of error associated with the measurement of the particular quantity. When used in the context of a range, the term "about" should also be considered as disclosing the range defined by the absolute values of the two endpoints. For example, the range "from about 2 to about 4" also discloses the range "from 2 to 4."

In one embodiment, the present disclosure relates to a shaver (e.g., an electric shaver, an electric razor, or the like) that comprises a gripping means and a cutting means, configured in such a manner that allows the shaver to be oriented with the grip portion above the cutter portion, thus making it anatomically convenient to hold the shaver against the top and sides of the head, and generally against the skin of the user when shaving one's face.

Referring now to the drawings in detail wherein like reference numerals have been used throughout the various figures to designate like elements, there is shown in FIGS. 1-6 an electric head razor constructed in accordance with the principles of the present invention and designated generally as 100.

Figure 2:
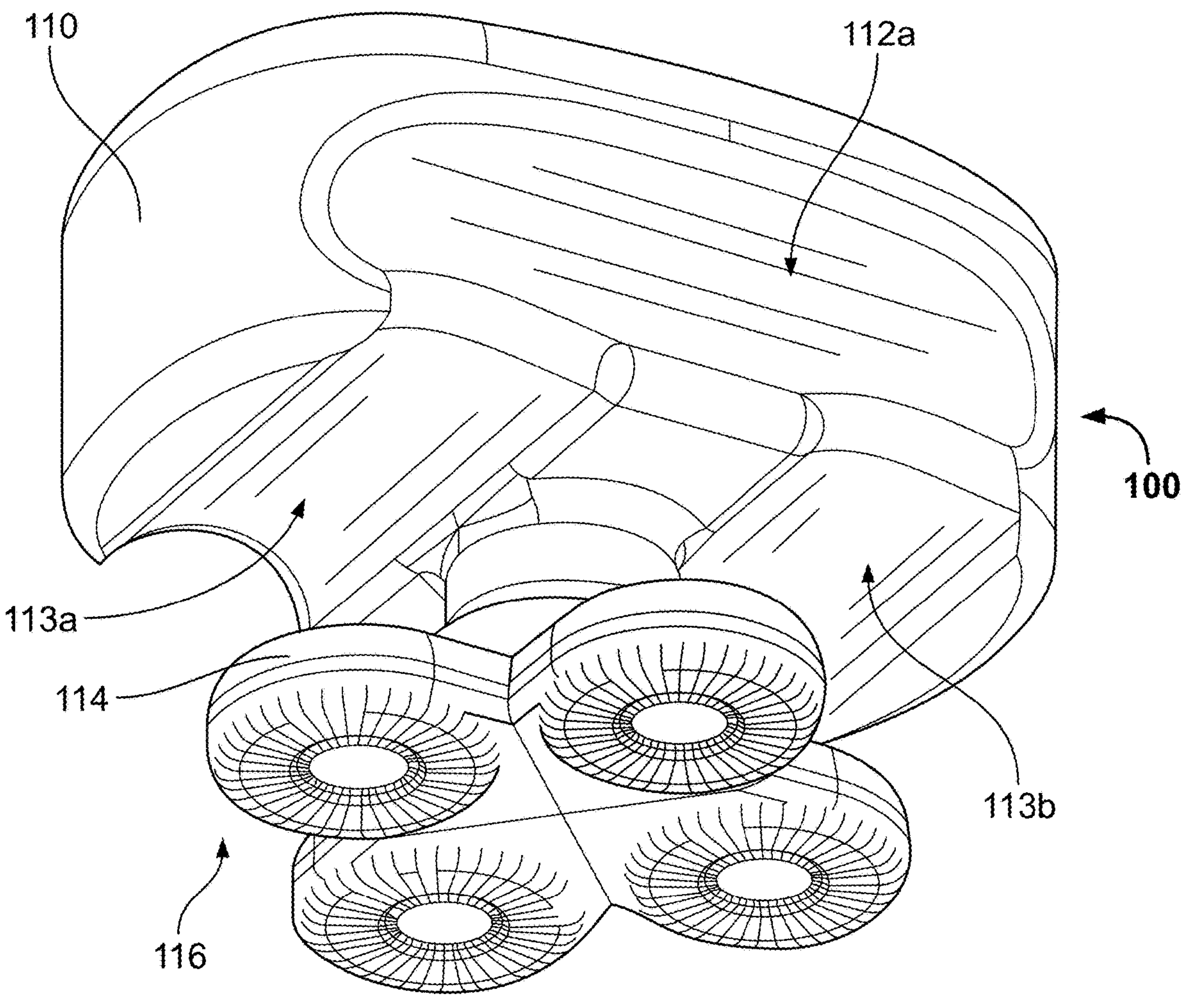
FIG. 2 is a bottom perspective view of an exemplary electric head razor of FIG. 1.
Figure 3:
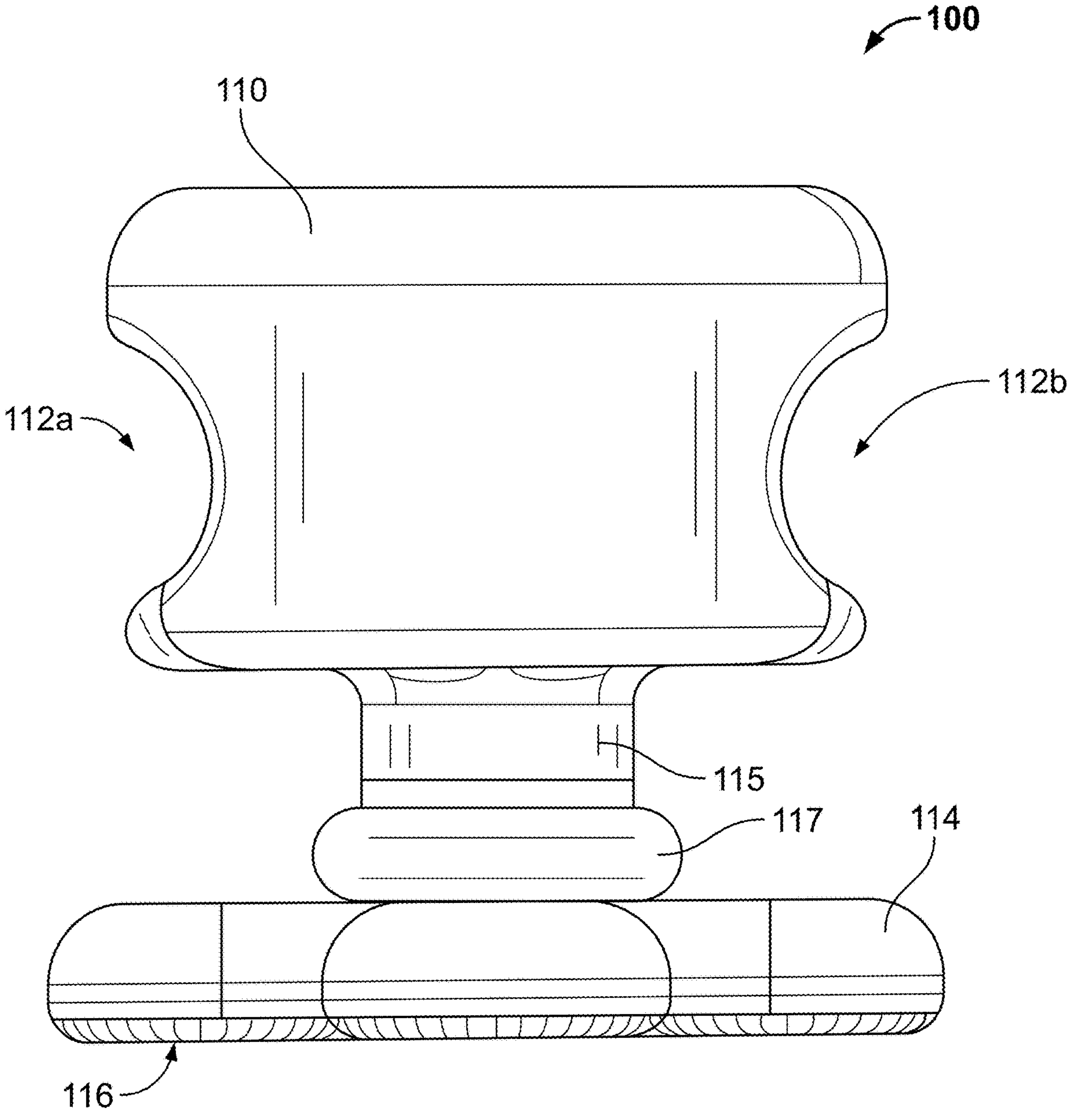
FIG. 3 is a side view of an exemplary electric head razor of FIG. 1.
Figure 4:
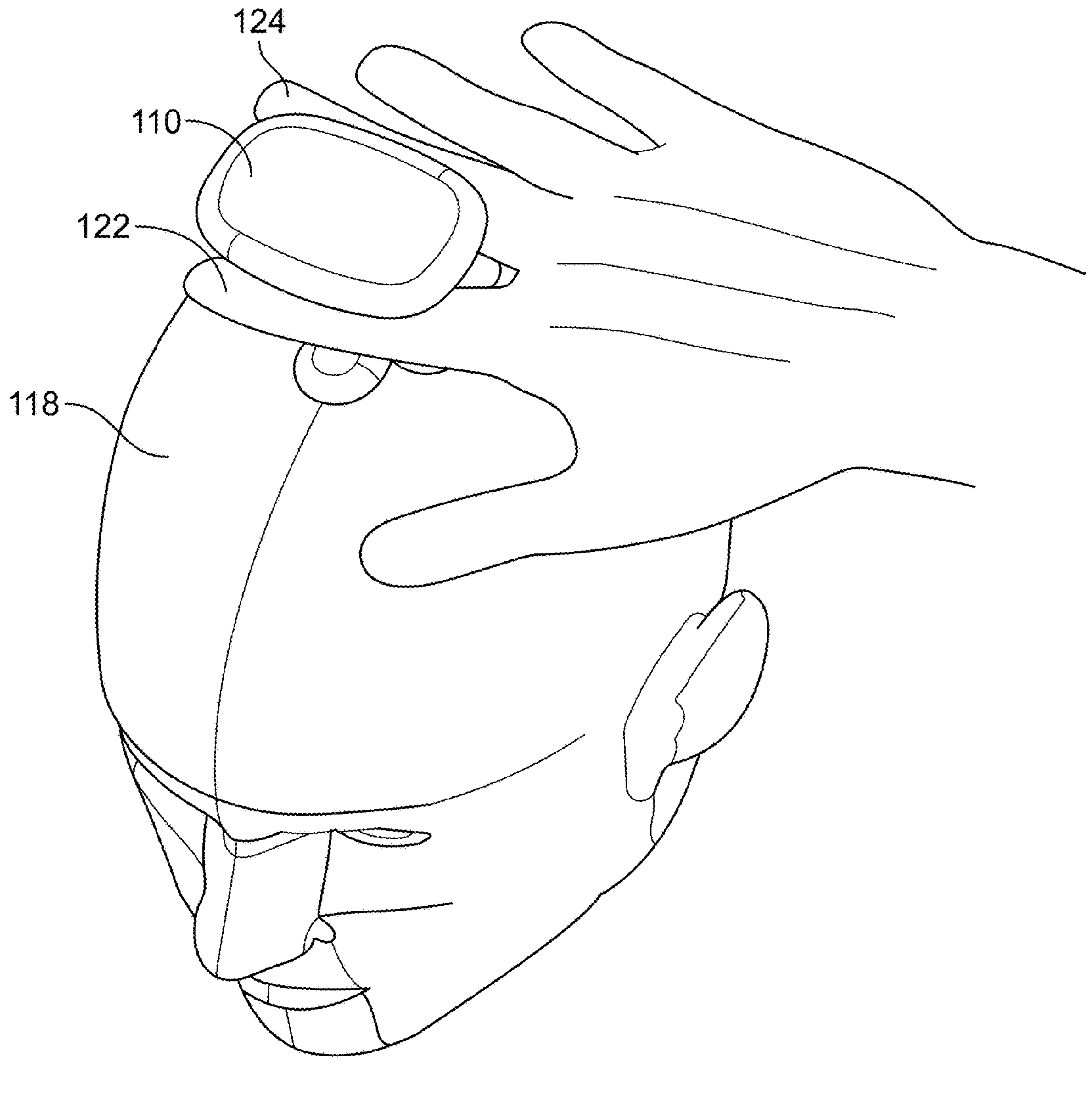
FIG. 4 is a perspective view of a first way of holding an exemplary electric head razor of FIG. 1 to shave one's head.
Figure 5:
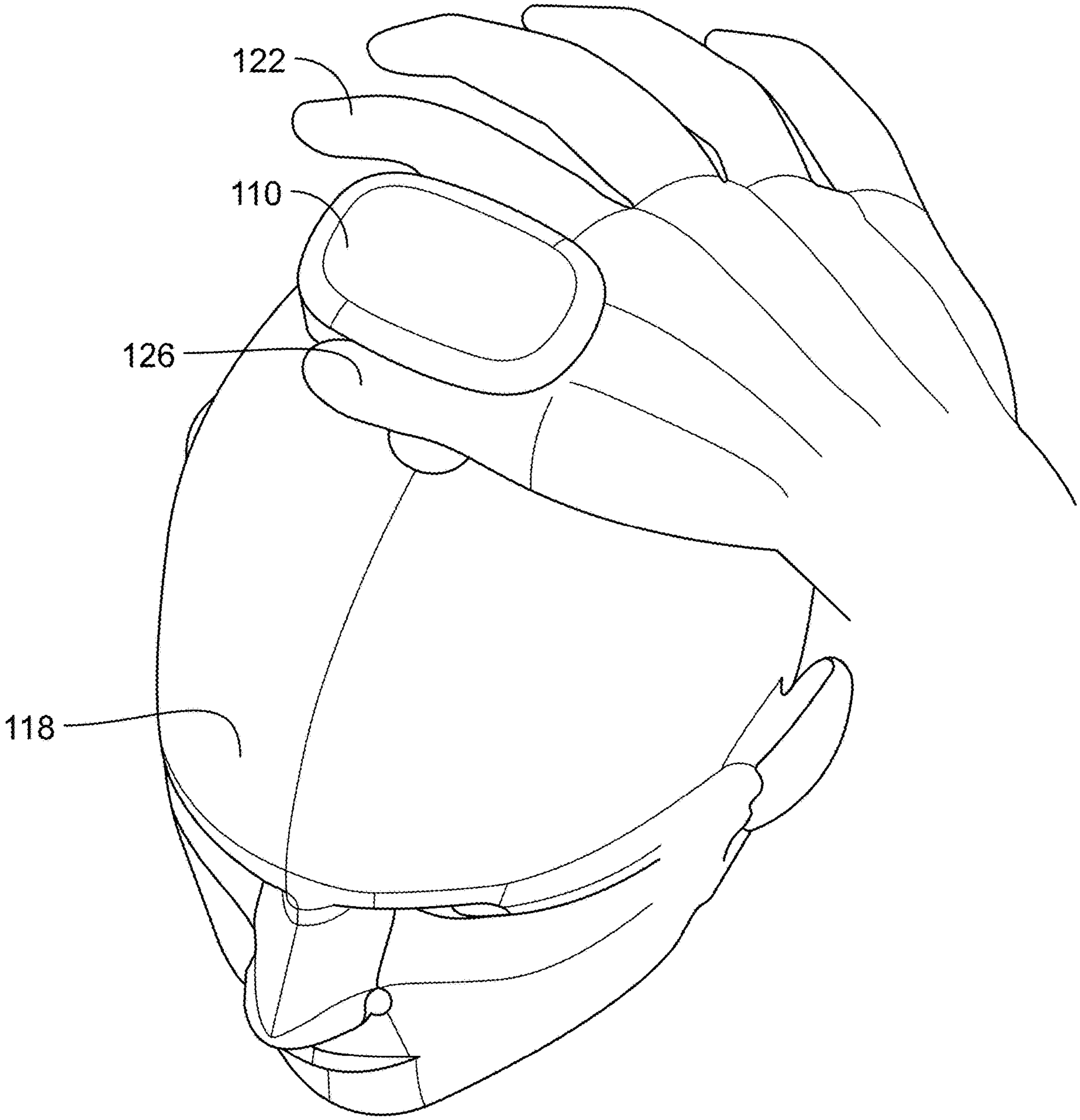
FIG. 5 is a perspective view of a second way of holding an exemplary electric head razor of FIG. 1 to shave one's head.
Figure 6:
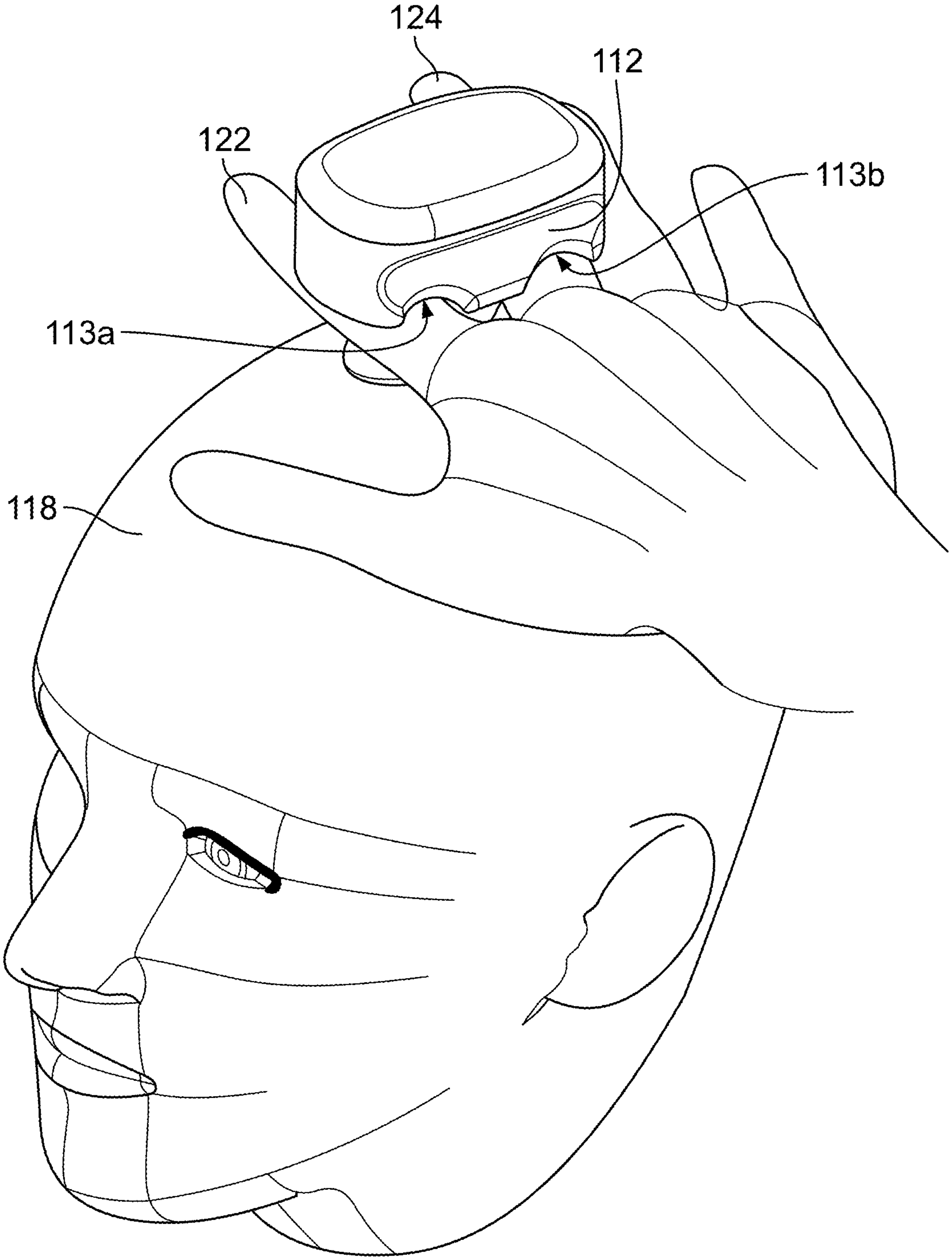
FIG. 6 is a perspective view of a third way of holding an exemplary electric head razor of FIG. 1 to shave one's head.
Figure 7:
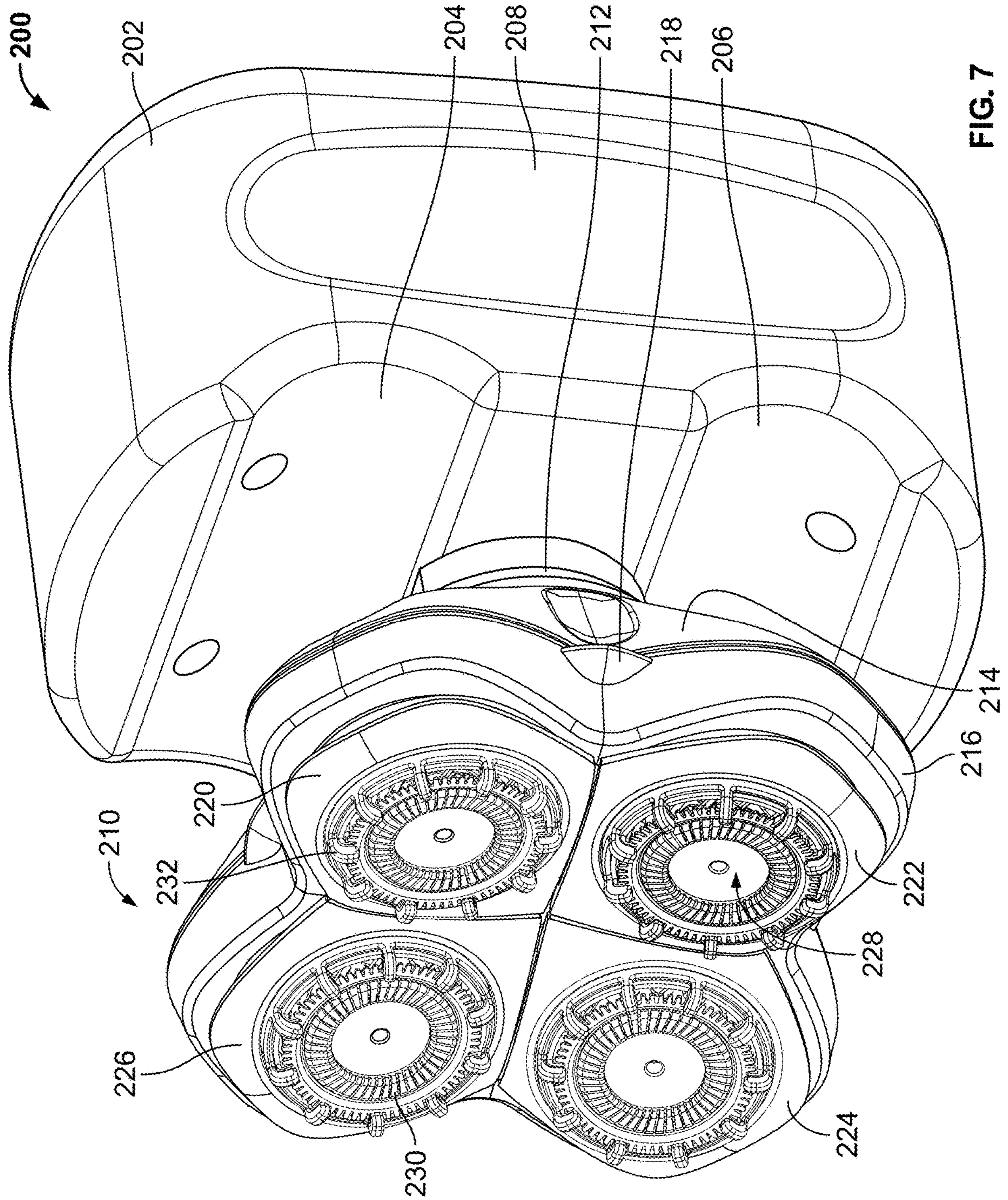
FIG. 7 is a perspective view of a head for an exemplary electric shaver in accordance with embodiments of the present disclosure, including spacer elements.

As pointed out above, FIG. 1 is a top perspective view of one exemplary embodiment of an electric shaver of the present invention. FIG. 2 is a bottom perspective view of the shaver of FIG. 1. FIG. 3 is an end view of the shaver of FIG. 1. FIG. 4 is a front, perspective view of the shaver of FIG. 1 depicting the shaver held between the index and middle finger with the cutter surface held against the top of the head. FIG. 5 is a front perspective view of the shaver of FIG. 1 depicting the shaver held between the thumb and index finger and held with the cutter surface against the top of the head. FIG. 6 is a front perspective view of the shaver of FIG. 1 depicting an alternate way of holding the same between the index and middle fingers with the cutter surface against the top of the head.

As shown in FIG. 1 through FIG. 3, the shaver 100 comprises an upper portion 110 that provides a substantially rectangularly shaped housing for a power source and motor related components, and a cutter head 114 that further comprises at least one rotating or oscillating cutter or array of cutters 116. The connection between the motor and the cutter head passes through the central hub 115 which may have an enlarged lower portion 117. The cutter head 114 may be comprised of a flexible or semi-flexible material such as castable elastomer allowing the cutter heads to flex when meeting the curved surface of the head. The motor (not shown) is mechanically coupled to the cutters 116 in a known manner.

The motor, power supply and other related components along with the rotating or oscillating cutters are not, per se, part of the present inventive concept. They are all individually common and well known in the art. Accordingly, detailed descriptions of the same are not believed to be necessary. As is also known, and as can be seen, the rotating or oscillating cutters meet rounded as well as flat surfaces, appropriately for shaving.

The housing 110 further comprises a particular form that provides a gripping means, and fits the hand in a comfortable manner, especially when the shaver is held in an orientation wherein the housing is above the cutter. The gripping means includes a pair of elongated recesses in the form of parallel concave surfaces 112 *a* and 112 *b* formed on either side of the housing 110. The concave surfaces are parallel to the plane defined by the cutting surface of the cutters 116. A second pair of elongated recesses in the form of concave surfaces 113 *a* and 113 *b* are formed in the under surface of the housing above the cutters 116. The second pair of concave surfaces 113 *a* and 113 *b* are arranged to be perpendicular to the first pair of concave surfaces 112 *a* and 112 *b* and also parallel to the plane defined by the cutting surface of the cutters 116.

Referring to FIG. 3 and FIG. 4, concave surfaces 112 *a* and 112 *b* (FIG. 3) are configured to allow the shaver 100 to be gripped in the manner illustrated in FIG. 4, wherein the shaver is gripped between the index finger 122 and middle finger 124, and held against the scalp 118 with the user's palm facing downwardly. The remainder of the hand may rest against the scalp in a manner that allows the user to feel the surface of the scalp, which helps the user guide the shaver cutting surface as well as inspect the quality of the shave by feel.

Referring to FIG. 3 and FIG. 5, concave surfaces 112 *a* and 112 *b* (FIG. 3) are configured to allow the razor 100 to be gripped as illustrated in FIG. 5, in which the shaver is gripped between the thumb 126 and index finger 122, and held against the skull 118. The remainder of the hand may rest against the scalp as in the aforementioned gripping manner.

Referring to FIG. 6, concave surfaces 113 *a* and 113 *b* are configured to allow the razor 100 to be gripped as illustrated in FIG. 6, in which the shaver is gripped between the index finger 122 and middle finger 124 with the tops of the fingers lying within the concave surfaces or recesses 113 *a* and 113 *b*, and held against the skull 118. In this position, the inside surfaces of the fingers 122 and 124 grip either side of the central hub 115 and the lower part of the fingers press downwardly, at least in part, on the enlarged lower portion 117 of the hub 115. The remainder of the hand may rest against the scalp as in the aforementioned gripping manner.

FIGS. 7-15 are perspective, front, rear, detailed and cross-sectional views of an exemplary electric shaver 200 (hereinafter "shaver 200"). As discussed above, the shaver 200 includes a housing 202 with two concave sections 204, 206 formed in the front face of the housing 202, and two concave sections 208 (only one visible) formed in the side faces of the housing 202. The concave sections 204, 206, 208 provide for improved gripping of the shaver 200 during use. The shaver 200 includes a shaver head 210 releasably coupled to the housing 202 via a coupling connection 212. The coupling connection 212 allow for disengagement of the shaver head 210 from the housing 202 by rotating the shaver head 210 counterclockwise, and engagement by rotating the shaver head 210 clockwise.

The shaver head 210 includes a rear housing section 214 and a front housing section 216 releasably coupled to the rear housing section 214. Tabs 218 on opposing sides of the front housing section 216 can be used to disengage the front housing section 216 from the rear housing section 214, thereby exposing the internal components of the front housing section 216 for cleaning. The front housing section 216 includes multiple frames 220, 222, 224, 226 (e.g., four frames) movably coupled to the front housing section 216. Each of the frames 220-226 supports a rotary cutter assembly 228 which includes a rotary cutter 230 and a spacer element ring 232, each of which is discussed in greater detail below. The rotary cutter assembly 228 can be movably positioned relative to the respective frames 220-226, e.g., via spring-loaded mounting, or the like.

Figure 8:
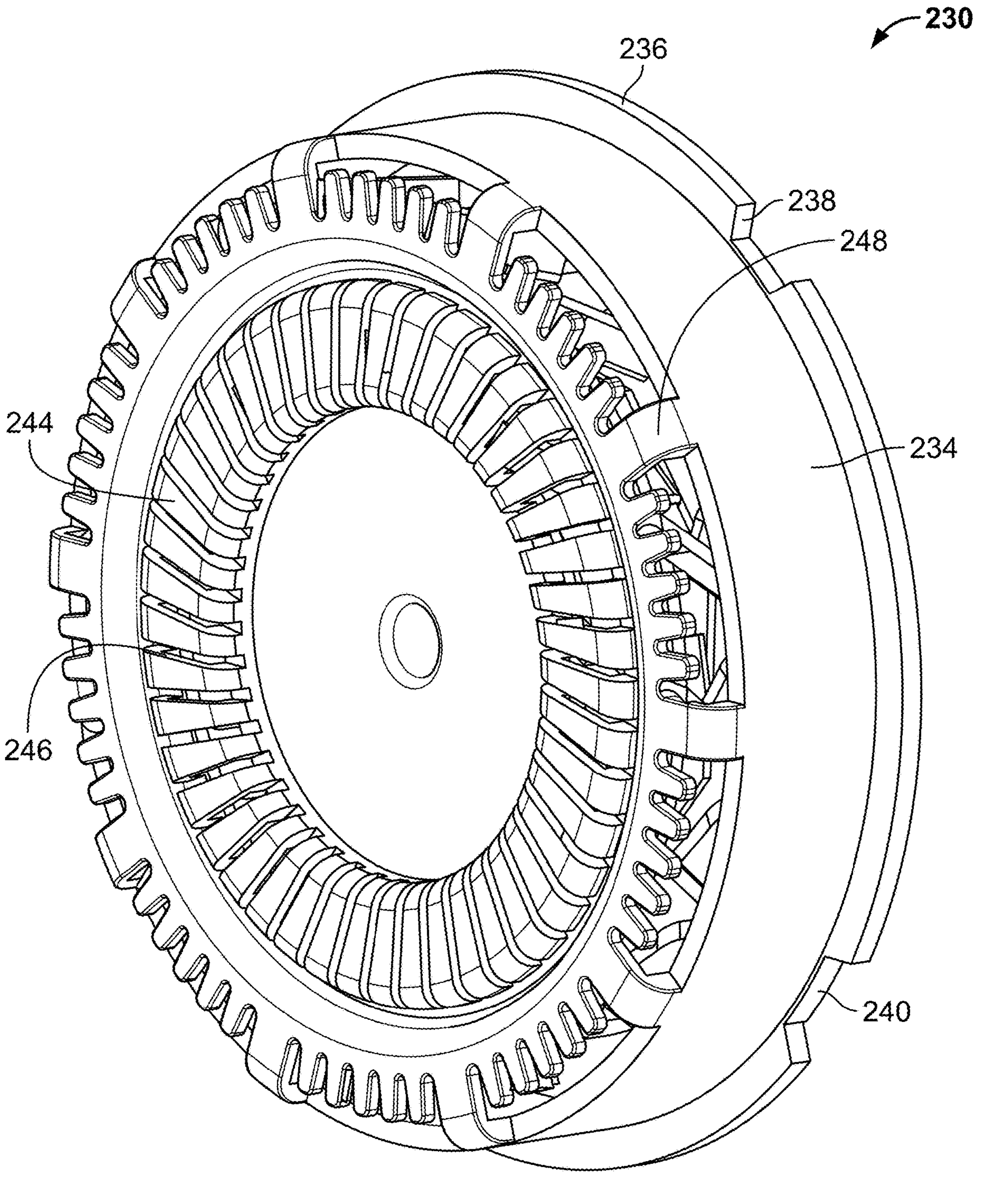
FIG. 8 is a perspective, detailed view of a rotary cutter for an exemplary electric shaver of FIG. 7.
Figure 9:
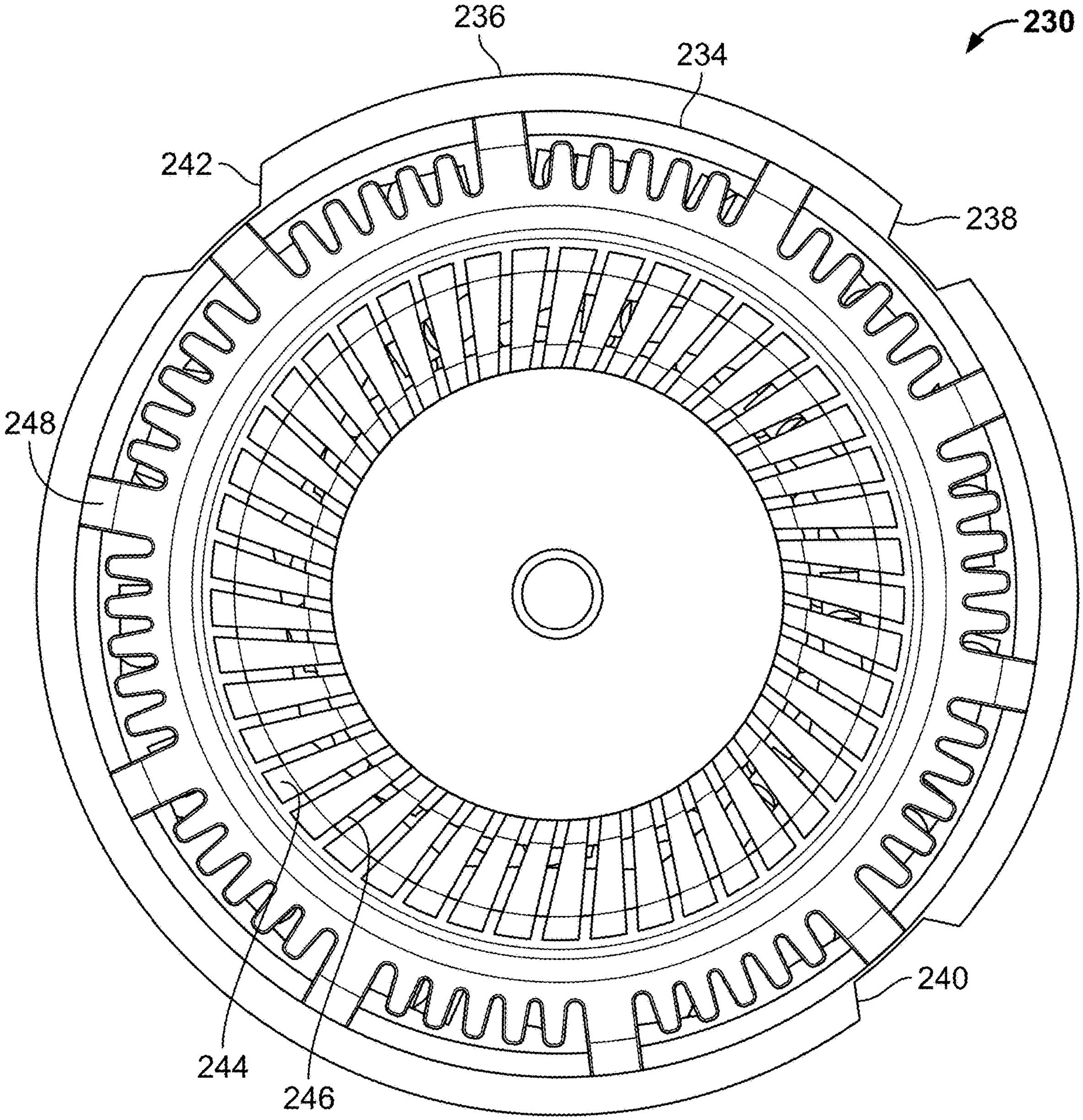
FIG. 9 is a front, detailed view of a rotary cutter for an exemplary electric shaver of FIG. 7.
Figure 10:
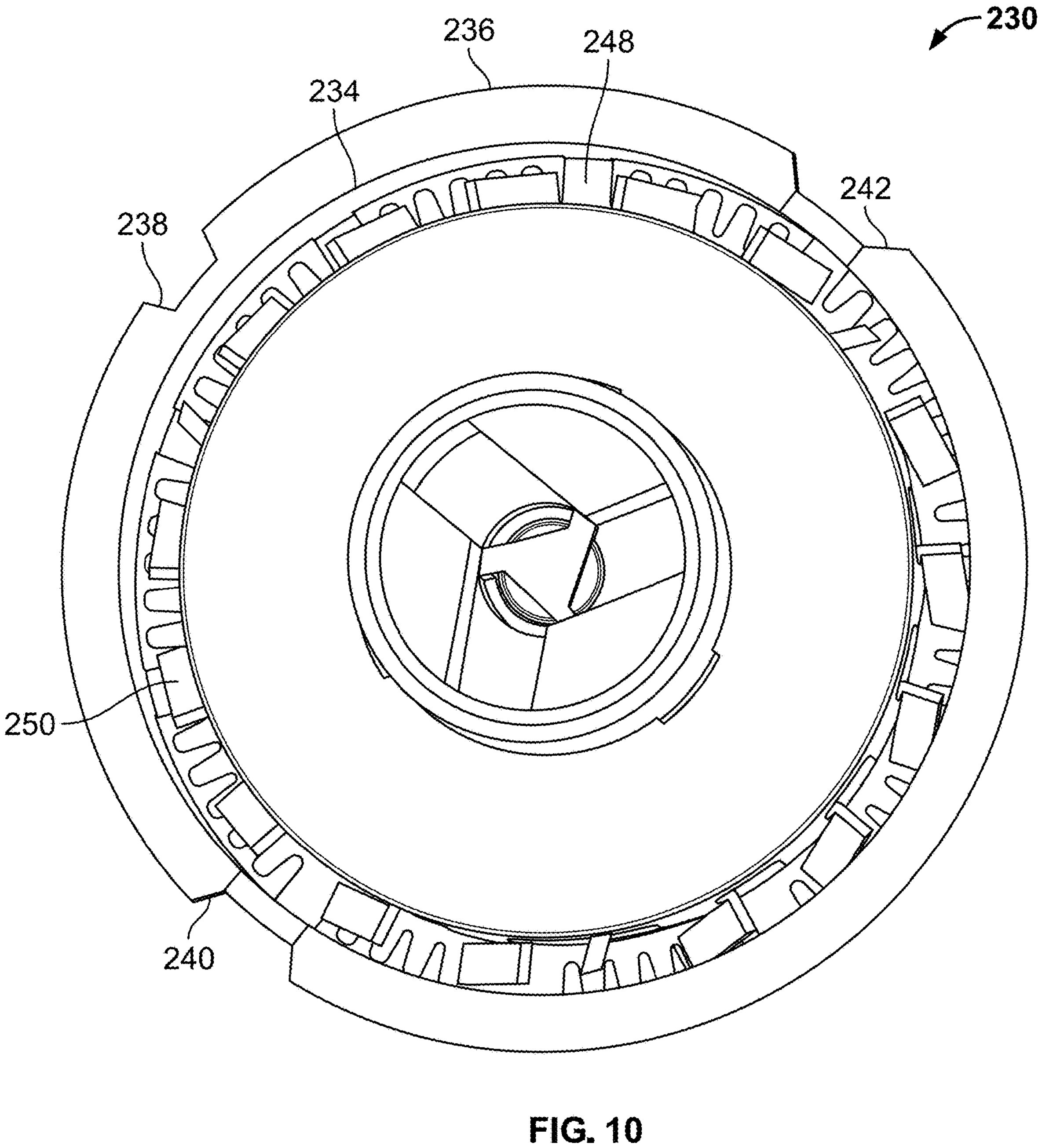
FIG. 10 is a rear, detailed view of a rotary cutter for an exemplary electric shaver of FIG. 7.

FIGS. 8-10 show perspective, front and rear views of the cutter 230. The cutter 230 includes a substantially cylindrical body 234 defining a continuous surface. The rear edge of the body 234 includes a lip or flange 236 extending radially and perpendicularly therefrom. The flange 236 defines a step along the perimeter rear edge of the body 234. Along its circumference, the flange 236 can include one or more cutouts 238, 240, 242. The stationary front surface 244 of the cutter 230 includes apertures 246 through which hairs can pass, and an inner array of reciprocating or rotating blades 250 within the shaver head 210 operate in a shearing engagement with the front surface 230 to provide the shaving action.

The perimeter edge of the front surface 244 is connected to the front edge of the body 234 by intermittently extending radial extensions 248. The extensions 248 are radially spaced from each other along the perimeter edge of the front surface 244, and curve about 90° to connect the front surface 244 with the front edge of the body 234. The extensions 248 can include a first section extending perpendicularly outward from the front edge of the body 234 aligned with the body 234, and a second section extending perpendicularly outward from the edge of the front surface 244 such that the first and second sections extend perpendicularly relative to each other. A curved section connects the first and second sections to create the 90° connection.

Figure 11:
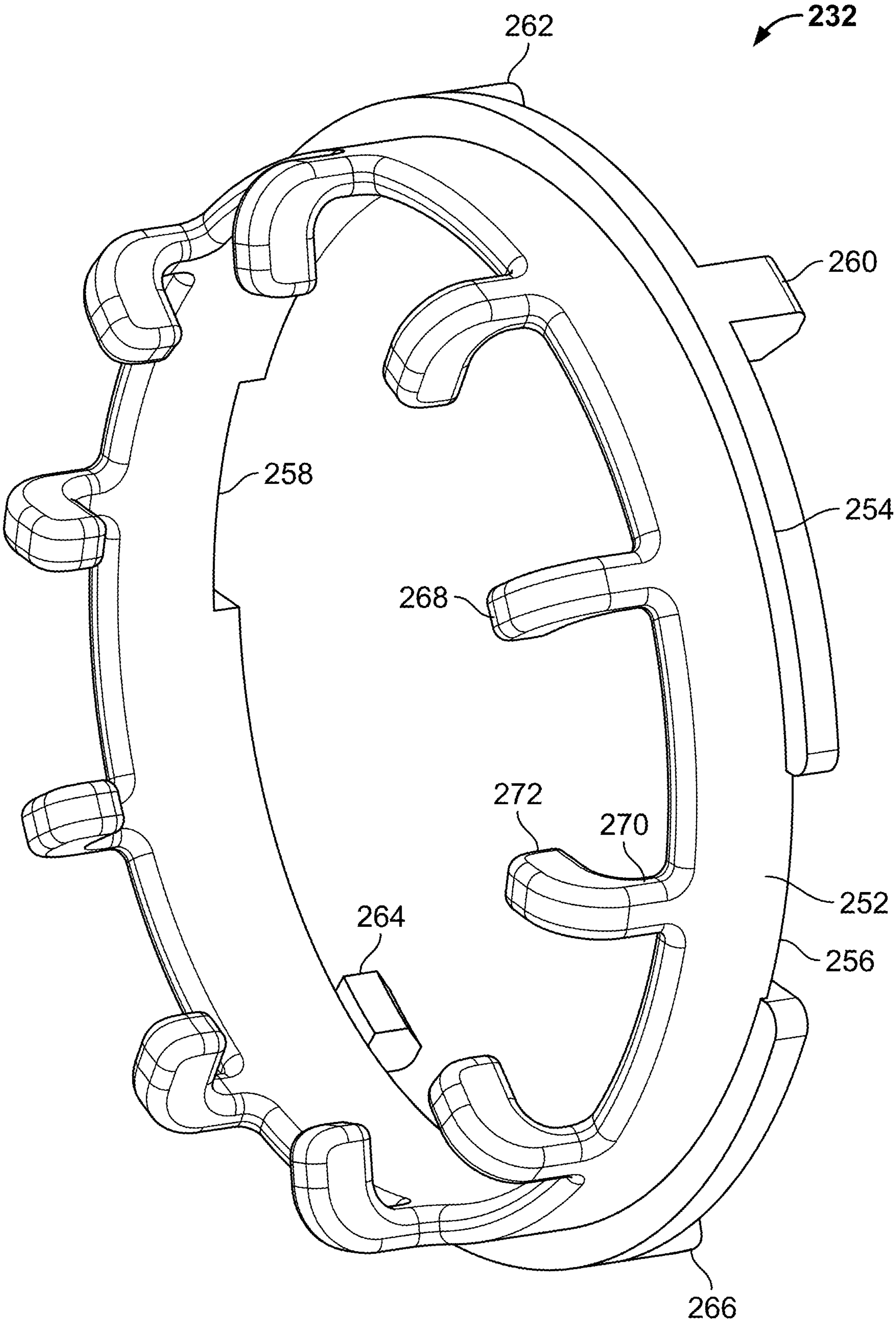
FIG. 11 is a perspective, detailed view of a spacer element ring for an exemplary electric shaver of FIG. 7.
Figure 12:
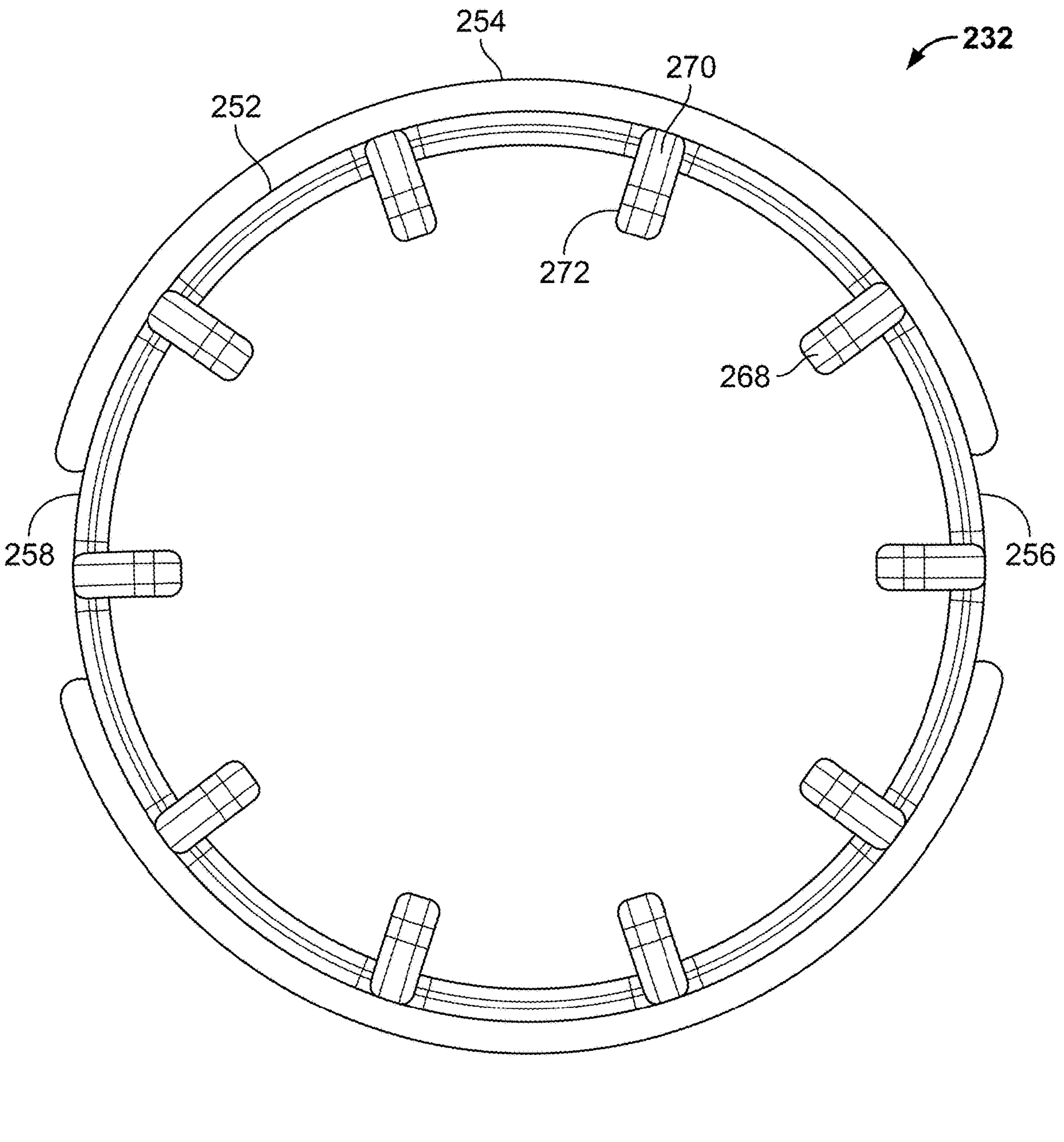
FIG. 12 is a front, detailed view of a spacer element ring for an exemplary electric shaver of FIG. 7.
Figure 13:
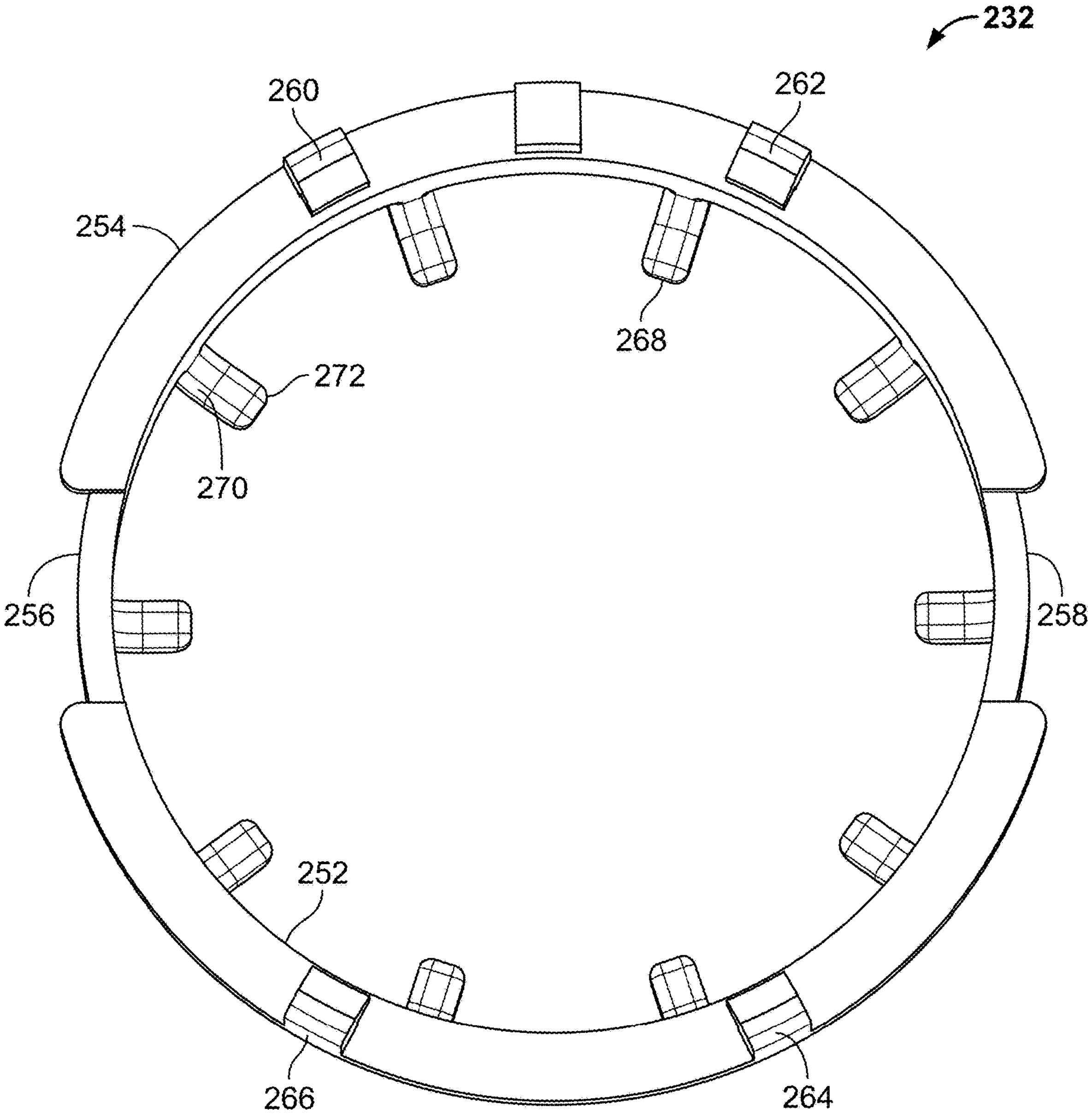
FIG. 13 is a rear, detailed view of a spacer element ring for an exemplary electric shaver of FIG. 7.

FIGS. 11-13 show perspective, front and rear views of a spacer element ring 232. The spacer element ring 232 includes a substantially cylindrical body 252 defining an inner diameter complementary to the outer diameter of the body 234 of the cutter 230, such that the spacer element ring 232 can slide and sit over the body 234 of the cutter 230. The body 252 defines a substantially uniform surface without openings. The rear edge of the body 252 includes a radial lip or flange 254 extending radially and perpendicularly therefrom. The flange 254 defines a step along the perimeter rear edge of the body 252. In some embodiments, the flange 254 can extend along the entire perimeter of the rear edge of the body 252. In some embodiments, the flange 254 can include gaps 256, 258 along one or more areas along the circumference. The flange 254 is configured and dimensioned to at least partially engage with the flange 236 of the cutter 230.

The rear edge or surface of the flange 254 includes two or more latching elements 260, 262, 264, 266 configured to detachably engage with the cutter 230 to assemble the spacer element ring 232 with the cutter 230. The latching elements 260-266 can be in the form of extensions having a hook or lip on an inner edge, the extensions having a flexibility that allows them to flex and snap around the rear edge of the flange 236 of the cutter 230. The front edge or surface of the body 252 includes spacer elements 268 extending therefrom. The spacer elements 268 are radially spaced from each other along the entire circumference of the front edge of the body 252.

In some embodiments, the ring 232 can include ten spacer elements 268 radially spaced along the front edge of the body 252. In some embodiments, the ring 232 can include more or less spacer elements 268 radially spaced along the front edge of the body 252 while still achieving the desired stubble outcome. Each spacer element 268 includes a first section 270 extending outward in a direction parallel to the wall of the body 252, and a second section 272 curving about 90° and extending perpendicularly inward in the direction of the central longitudinal axis of the ring 232. The height of the first section 270 and the length of the second section 272 are selected to be substantially complementary to the dimensions of the cutter 230 such that the spacer elements 268 rest against or abut the top of the cutter 230. This positioning provides the spacing functionality for trimming, while ensuring that the spacer elements 268 do not interfere with the blade operation.

Figure 14:
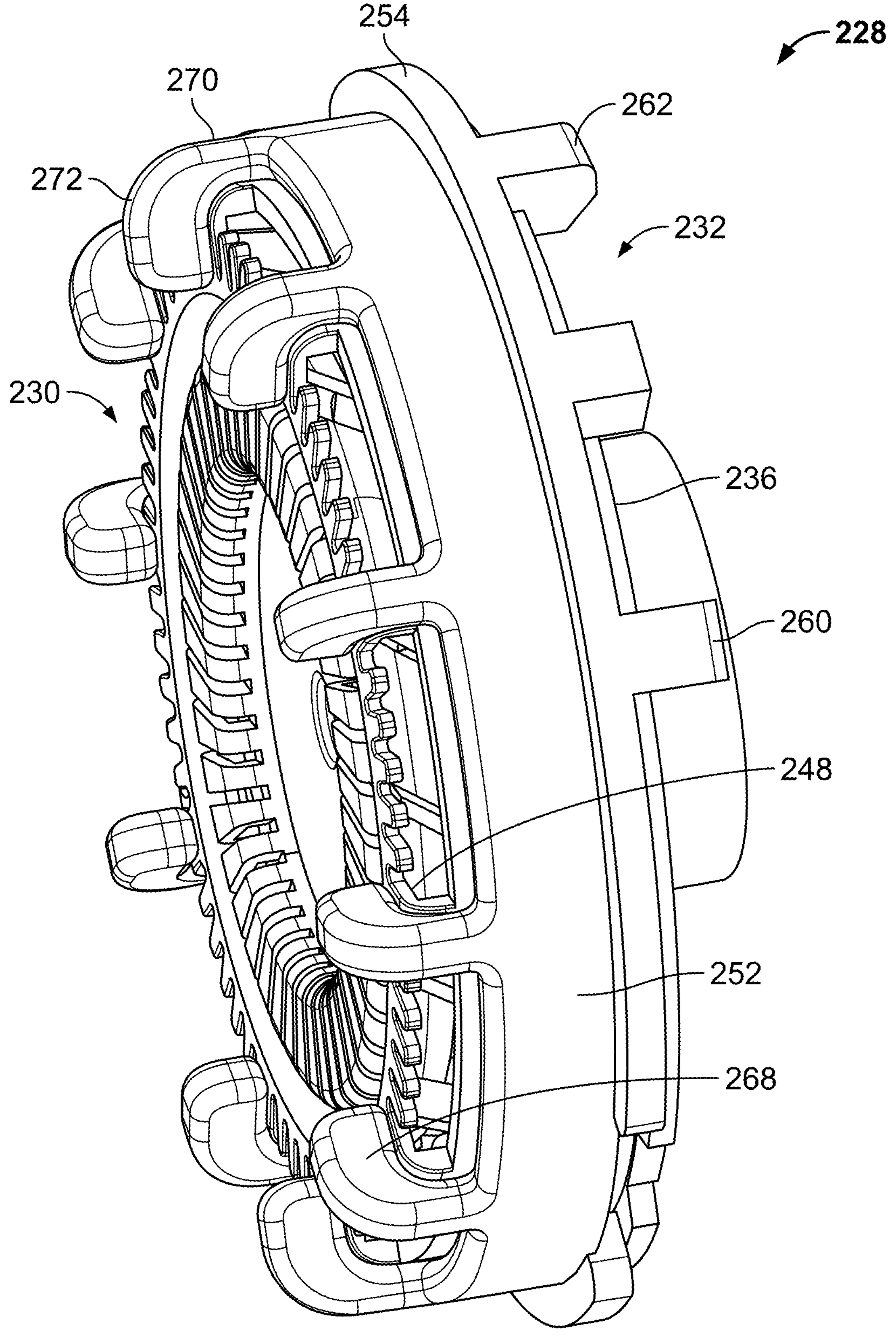
FIG. 14 is a side, detailed view of a rotary cutter and a spacer element ring for an exemplary electric shaver of FIG. 7.
Figure 15:
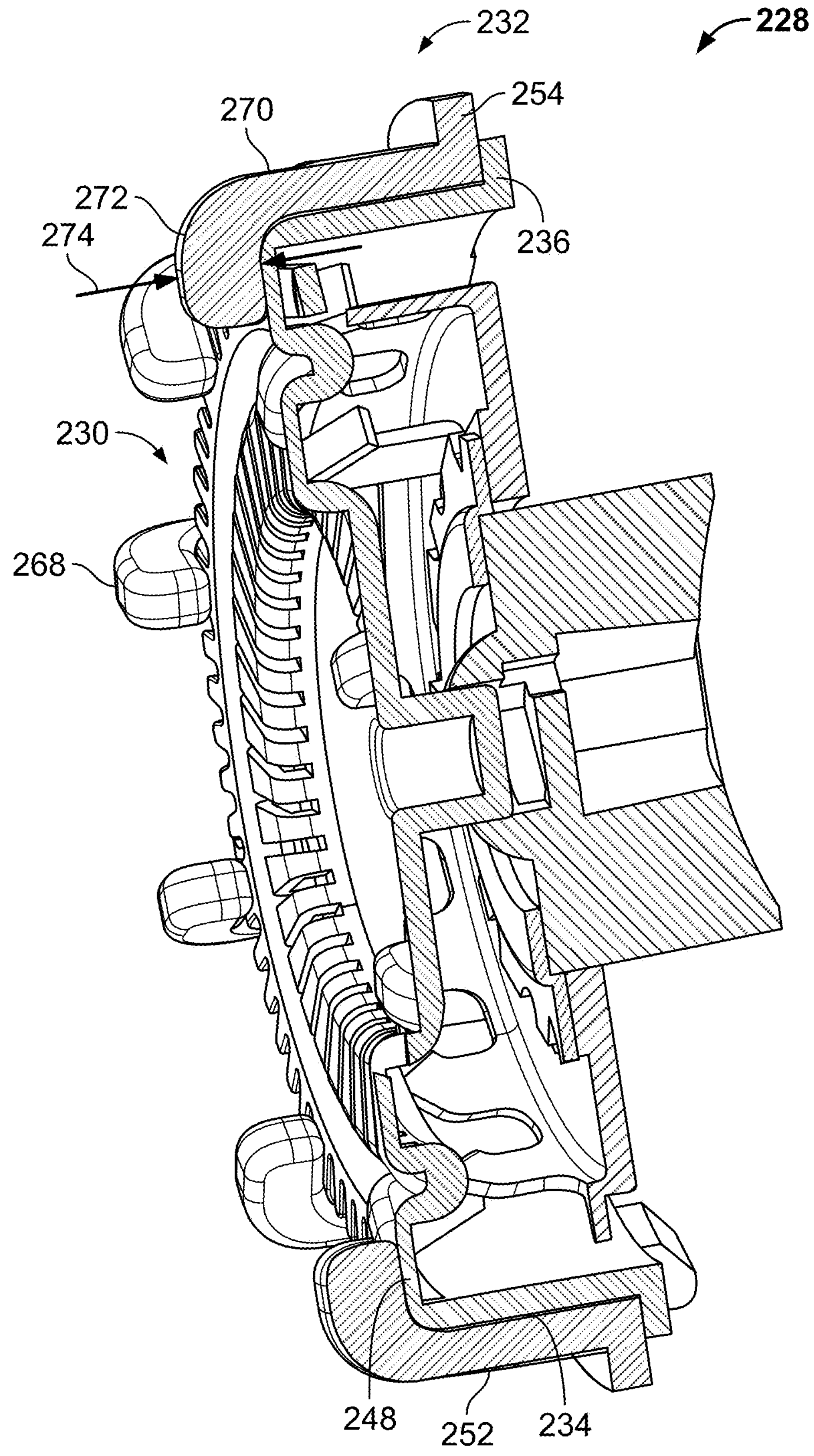
FIG. 15 is a cross-sectional, detailed view of a rotary cutter and a spacer element ring for an exemplary electric shaver of FIG. 7.

FIGS. 14 and 15 show perspective and cross-sectional views of the assembly of the cutter 230 and the spacer element ring 232. The spacer element ring 232 is sized such that the body 252 slides over the body 234 of the cutter 230, with the bodies 252, 234 directly against each other. The latching elements 260-266 snap around the flange 236 of the cutter 230 to couple the spacer element ring 232 to the cutter 230. In the assembled configuration, the central longitudinal axis of the spacer element ring 232 and the cutter 230 align. The spacer element ring 232 can be rotated such that each of the spacer elements 268 is positioned over and against a complementary extension 248 of the cutter 230, which serve as platforms for supporting the underside of the spacer elements 268. The number of extensions 248 and the number of spacer elements 268 can therefore correspond.

As illustrated in FIG. 15, the thickness 274 of the spacer elements 268 provides an offset distance that prevents shaving or shearing of hair when the shaver 200 is used. In some embodiments, the thickness 274 of the spacer elements 268 can be about, e.g., 2-4 mm inclusive, 2-3 mm inclusive, 3-4 mm inclusive, 2 mm, 3 mm, 4 mm, or the like. In particular, when the shaver head 210 is positioned against the skin of the user, the spacer elements 268 maintain an offset distance of the shaver head 210 from the surface of the skin, thereby preventing a close shave and leaving stubble. In some embodiments, different shaver heads 210 having spacer elements 268 of different thicknesses 274 can be interchangeably used depending on the desired stubble length. In some embodiments, an internal mechanism can be used that allows for movement of the spacer element ring 232 relative to the cutter 230 for adjustment of the position of the spacer elements 268, thereby allowing an adjustment of the offset distance created by the spacer elements 268 to achieve different stubble lengths using a single shaver head 210.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method of shaving, comprising:

positioning a spacer element ring at least partially around at least one rotary cutter assembly such that two or more spacer elements of the spacer element ring are positioned over and against a front surface of at least one rotary cutter assembly of a shaver head of an electric shaver, wherein (i) the at least one rotary cutter assembly includes a body with the front surface including apertures configured to receive hair therethrough and one or more blades disposed under the front surface, and (ii) the two or more spacer elements are radially spaced around the at least one rotary cutter assembly, each of the two or more spacer elements extends inwardly in a direction of a central longitudinal axis of the at least one rotary cutter assembly, and each of the two or more spacer elements extends only a partial distance over the at least one rotary cutter assembly;

positioning the shaver head of the electric shaver against skin of a user; and preventing a clean shave and creating stubble when shaving with the shaver head based on an offset distance from the front surface of the at least one rotary cutter assembly provided by the two or more spacer elements, wherein the offset distance prevents the hair from reaching the one or more blades of the at least one rotary cutter assembly to prevent the clean shave and to create the stubble when shaving.

2. An electric shaver head, comprising:

a shaver head housing;

at least one rotary cutter assembly disposed in the shaver head housing, the at least one rotary cutter assembly including a body with a front surface including apertures configured to receive hair therethrough, and one or more blades disposed under the front surface; and a spacer element ring configured to be positioned at least partially around the at least one rotary cutter assembly, wherein the spacer element ring includes two or more spacer elements configured to be positioned over and against the front surface of the at least one rotary cutter assembly;

wherein the two or more spacer elements are radially spaced around the at least one rotary cutter assembly;

wherein each of the two or more spacer elements extends inwardly in a direction of a central longitudinal axis of the at least one rotary cutter assembly, and each of the two or more spacer elements extends only a partial distance over the at least one rotary cutter assembly; and wherein the two or more spacer elements provide an offset distance from the front surface of the at least one rotary cutter assembly to prevent the hair from fully reaching the one or more blades of the at least one rotary cutter assembly to prevent a clean shave and to create stubble when shaving.

3. The electric shaver head of claim 2, wherein the at least one rotary cutter assembly includes first, second, third and fourth rotary cutter assemblies.

4. The electric shaver head of claim 3, wherein each of the first, second, third and fourth rotary cutter assemblies includes the spacer element ring with the two or more spacer elements.

5. The electric shaver head of claim 2, wherein the at least one rotary cutter assembly includes a cutter body defining a substantially cylindrical configuration.

6. The electric shaver head of claim 5, wherein the spacer element ring defines a substantially cylindrical configuration complementary to the substantially cylindrical configuration of the cutter body such that the spacer element ring slides over the cutter body.

7. The electric shaver head of claim 5, wherein the cutter body includes a radial flange extending from a rear edge of the cutter body.

8. The electric shaver head of claim 7, wherein the spacer element ring is configured to be positioned at least partially around the cutter body, the spacer element ring including latching elements extending from a rear surface.

9. The electric shaver head of claim 8, wherein the latching elements are configured to snap around the radial flange extending from the rear edge of the cutter body to releasably couple the spacer element ring to the cutter body.

10. The electric shaver head of claim 2, wherein the spacer element ring positions the two or more spacer elements against the top surface of the front surface of the at least one rotary cutter assembly such that the two or more spacer elements extend outward from the top surface of the at least one rotary cutter assembly.

11. The electric shaver head of claim 2, wherein the two or more spacer elements are radially spaced along a front edge of the spacer element ring.

12. The electric shaver head of claim 2, wherein each of the spacer elements defines a first section extending from a body of the spacer element ring in a direction parallel to the body, and a second section curving about 90° inward toward the central longitudinal axis of the at least one rotary cutter assembly and a central longitudinal axis of the spacer element ring.

13. The electric shaver head of claim 2, wherein the top surface of the at least one rotary cutter assembly includes extensions that connect the top surface to a body of the at least one rotary cutter assembly, and wherein a number of the extensions corresponds with a number of the two or more spacer elements.

14. The electric shaver head of claim 13, wherein the two or more spacer elements are positioned against the respective extensions of the at least one rotary cutter assembly.

15. The electric shaver head of claim 2, wherein the two or more spacer elements extend around front edges of the front surface of the at least one rotary cutter assembly.

16. An electric shaver, comprising:

a handle; and a shaver head releasably coupled to the handle, wherein the shaver head includes:

a shaver head housing;

at least one rotary cutter assembly disposed in the shaver head housing, the at least one rotary cutter assembly including a body with a front surface including apertures configured to receive hair therethrough, and one or more blades disposed under the front surface; and a spacer element ring configured to be positioned at least partially around the at least one rotary cutter assembly, wherein the spacer element ring includes two or more spacer elements configured to be positioned over and against the front surface of the at least one rotary cutter assembly;

wherein the two or more spacer elements are radially spaced around the at least one rotary cutter assembly;

wherein each of the two or more spacer elements extends inwardly in a direction of a central longitudinal axis of the at least one rotary cutter assembly, and each of the two or more spacer elements extends only a partial distance over the at least one rotary cutter assembly; and wherein the two or more spacer elements provide an offset distance from the front surface of the at least one rotary cutter assembly to prevent the hair from fully reaching the one or more blades of the at least one rotary cutter assembly to prevent a clean shave and to create stubble when shaving.

* * * * *